UNITED STATES PATENT OFFICE.

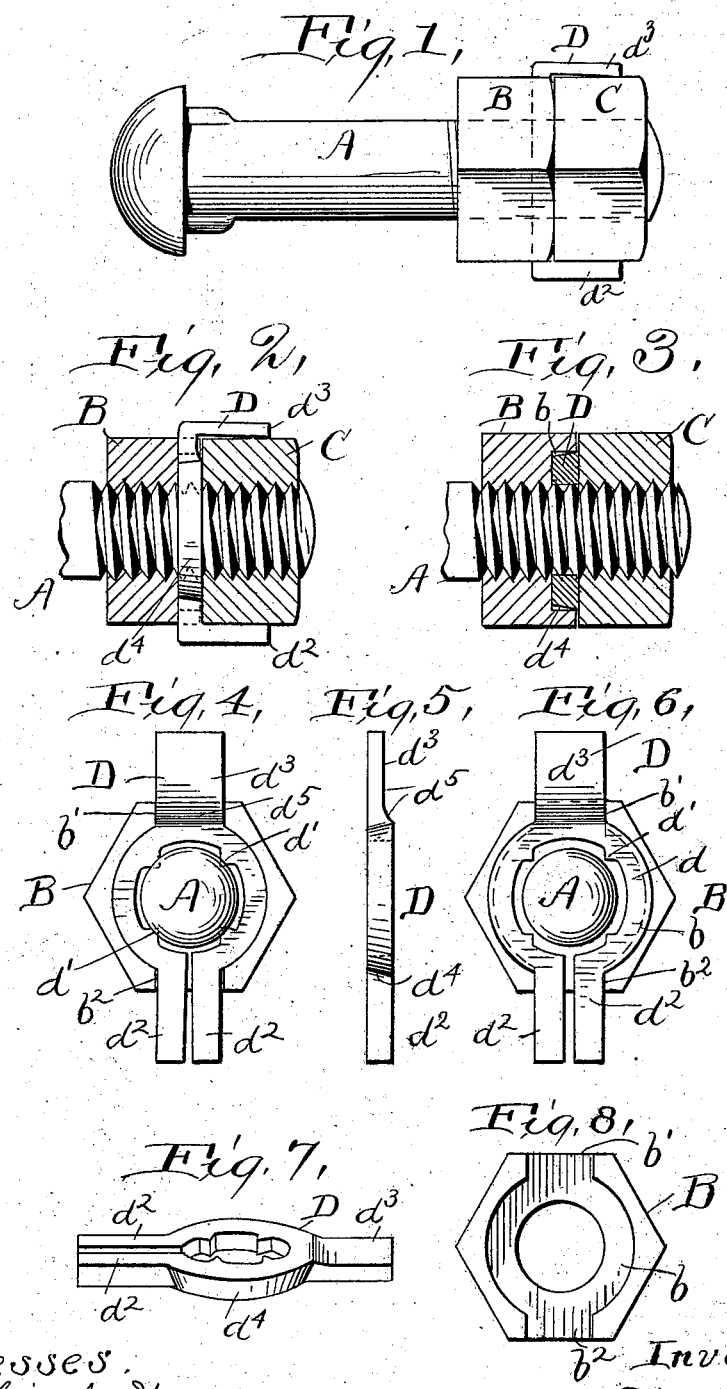

EDWIN T. WILCOX, OF BEREA, OHIO.

NUT-LOCK.

SPECIFICATION forming part of Letters Patent No. 692,573, dated February 4, 1902.

Application filed October 14, 1901. Serial No. 78,535. (No model.)

*To all whom it may concern:*

Be it known that I, EDWIN T. WILCOX, a citizen of the United States, residing at Berea, in the county of Cuyahoga and State of Ohio, have invented a certain new and useful Improvement in Nut-Locks, of which the following is a full, clear, and exact description, reference being had to the accompanying drawings.

In my prior application, Serial No. 73,422, filed August 27, 1901, I have shown a nut-lock adapted to hold a nut absolutely to its bolt. I have now discovered that the same system of locking may be employed also to hold a jam-nut onto the bolt, and this is particularly advantageous, because the jam-nut may be the means for forcing the locking-key into place.

The present invention comprises the particular arrangement of parts, as hereinafter described and claimed, whereby I am enabled to use the same lock to hold the nut and the jam-nut.

The invention is clearly illustrated in the drawings, wherein—

Figure 1 is a side elevation of a bolt with two nuts and my nut-lock applied. Figs. 2 and 3 are longitudinal sections of the nuts and the end of the bolt, being taken at right angles to each other. Figs. 4, 5, 6, and 7 are views of the key, Fig. 4 showing it in plan in place in the nut after being forced home by the jam-nut, Fig. 5 being an edge view of it alone, Fig. 6 showing it in the nut just as applied, but before being forced into place, and Fig. 7 being a perspective view of it. Fig. 8 is a plan of the nut alone.

The same letters of reference designate the same parts in each figure.

The bolt is represented by the reference-letter A, the main nut by B, and the jam-nut by C. In the outer face of the nut B is an annular recess $b$, having on diametrically opposite sides a pair of lateral openings $b'$ $b^2$ through the wall of the nut. This annular recess and openings are adapted to receive the locking-key.

The locking-key is a split ring, (designated D.) It consists, as shown, of the nearly-complete annular portion $d$, uneven on its inner periphery by means of the prongs $d'$. Its free ends $d^2$ $d^2$ extend outward, and on the diametrically opposite side from these free ends is a tail $d^3$, also extending outward. The bowed part $d$ of the ring is beveled on its outer periphery, as shown at $d^4$.

The ring D is placed over the bolt after the nut has been turned into place and is slipped easily part way into the recess $b$ in the nut B. The jam-nut C is then put in place and turned home. This forces the split ring into place within the recess $b$ in the nut B, and the inclined edge of the ring causes it to contract, its prongs biting into the bolt, and thus becoming clamped thereto. After the nut C has tightly clamped the ring against the base of the recess $b$ the nut C becomes thereby a jam-nut and itself holds the nut B. Thereafter the tail $d^3$ or the projecting ends $d^2$ of the ring may be bent up onto one of the sides of the jam-nut. As shown in the drawings, both the tail and the end $d^2$ are so bent up. It is considered only necessary in usual practice, however, to bend one of them. If desired, the ring may be thinned at the projecting portion, as indicated at $d^5$ in Fig. 5, to allow the more easy bending up of such projection. As will be seen by a comparison of Figs. 4 and 6, the ring in its normal position has its free ends slightly sprung apart, so that it may be very easily slipped over the bolt.

The nut B may be as conveniently and cheaply made by pressing between dies as an ordinary nut, and the locking-ring may likewise be cheaply constructed by stamping.

As stated, the jam-nut itself forms the tool for forcing the ring home. The main nut holding the projecting ends of the ring distant from the side of a rail, for example, if such is the purpose for which it is used, allows the projecting end to be very easily bent up by a crowbar and hammer or other tools.

With such a construction as I have shown no amount of jarring will loosen the jam-nut, and until it is loosened the main nut cannot be turned, for the ring absolutely locks it to the bolt. When it is necessary to remove the nuts, the simple driving of a cold-chisel between the projecting end of the ring and the side of the nut C and bending the projection down will allow the turning of the nut C and the removal of the ring and thereafter the removal of the nut B. The projecting ends of the ring also furnish means whereby it may be pried out of the nut no matter how tightly it becomes jammed therein.

Having described my invention, I claim—

1. The combination of a bolt, its nut and jam-nut, the said nut having an annular recess in the outer face thereof around the bolt and an outward opening from such recess, and a split locking-ring adapted to be forced into said recess and having an outward projection adapted to occupy said outward recess and extending sufficiently to be adapted to be bent up against the outer side of the jam-nut, the periphery of said locking-ring and the wall of said annular recess coöperating and one of them being beveled, substantially as described.

2. A bolt, its nut and jam-nut, there being an annular recess in the outer face of the nut and a pair of diametrically-opposed notches in said outer face, combined with a split locking-ring having a pair of outwardly-extending tongues occupying said notches and locking the ring to the nut, one of said tongues projecting beyond the notch and being adapted to be bent up along the side of the jam-nut, the periphery of said locking-ring and the wall of said annular recess coöperating and one of them being beveled, substantially as described.

3. The combination of a bolt and its nut having an annular recess in its outer face, and a notch connecting with said recess, and a split locking-ring having a tapered periphery, an uneven interior, and a pair of projecting free ends adapted to occupy said notch, substantially as described.

4. The combination of a bolt and its nut having an annular recess in its outer face, and a pair of diametrically-opposed notches leading from said recess, a split locking-ring having a tapered periphery and an uneven interior and two projecting free ends and a projection diametrically opposite said free ends, said two free ends being normally separated to allow the ring to be easily slipped over the bolt and being adapted to be brought toward each other when the ring is forced in place, substantially as described.

5. A locking-key for a nut-lock consisting of an annular split ring having an uneven interior and a tapered exterior, and a projecting tongue on the opposite side from the split of the ring, substantially as described.

In testimony whereof I hereunto affix my signature in the presence of two witnesses.

EDWIN T. WILCOX.

Witnesses:
ALBERT H. BATES,
H. M. WISE.